(12) United States Patent
Lee

(10) Patent No.: US 11,755,113 B2
(45) Date of Patent: Sep. 12, 2023

(54) NON-LINEAR CONTROL OF RELUCTANCE HAPTIC ENGINE

(71) Applicant: Apple Inc., Cupertino, CA (US)

(72) Inventor: Juil Lee, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 71 days.

(21) Appl. No.: 17/483,700

(22) Filed: Sep. 23, 2021

(65) Prior Publication Data

US 2023/0090674 A1 Mar. 23, 2023

(51) Int. Cl.
*H04B 3/36* (2006.01)
*G06F 3/01* (2006.01)
*H02K 33/16* (2006.01)
*H02K 11/215* (2016.01)

(52) U.S. Cl.
CPC ............ *G06F 3/016* (2013.01); *H02K 11/215* (2016.01); *H02K 33/16* (2013.01)

(58) Field of Classification Search
CPC ...... G06F 3/016; H02K 11/215; H02K 33/16; H02K 33/00; H02K 29/12; H02K 33/18; H02K 29/08; H02P 25/034; H02P 33/12; H02P 23/14; H02P 29/60
See application file for complete search history.

(56) References Cited

U.S. PATENT DOCUMENTS

| | | | |
|---|---|---|---|
| 9,607,491 B1* | 3/2017 | Mortimer | G06F 3/016 |
| 10,032,550 B1* | 7/2018 | Zhang | H01F 7/064 |
| 2021/0096647 A1* | 4/2021 | Amin-Shahidi | G06F 3/016 |
| 2023/0094873 A1* | 3/2023 | Chen | G06F 3/016 |
| | | | 345/156 |

* cited by examiner

*Primary Examiner* — Toan N Pham
(74) *Attorney, Agent, or Firm* — Fish & Richardson P.C.

(57) ABSTRACT

Embodiments are disclosed for non-linear control of a reluctance haptic actuator. A linear state feedback controller receives estimated position and velocity of a moving mass in a reluctance haptic engine and a reference position and velocity, generates a control signal based on the reference position and velocity and the estimated position and velocity. In response to the control signal, the drive electronics adjusts a current into at least one coil in the reluctance haptic engine to generate at least one magnetic field to control the moving mass. A non-linear state observer receives measurements of the voltage input into the reluctance haptic engine, the current, and an output voltage from a magnetic field sensor, and generates the estimated position and velocity of the moving mass based at least in part on the inputs, and sends the estimated position and velocity to the linear state feedback controller.

8 Claims, 5 Drawing Sheets

NON-LINEAR CONTROL OF RELUCTANCE HAPTIC ENGINE

TECHNICAL FIELD

This disclosure relates generally to haptic engines.

BACKGROUND

Many existing electronic devices include haptic actuators for providing haptic feedback, including smartphones, smartwatches and notebook computers. A typical linear haptic actuator (also referred to as a "haptic engine") includes a housing with a magnetic proof mass that moves when subjected to a Lorentz force produced by driving current through conductive loops within the housing. The movement of the proof mass is often controlled by a linear feedback controller that provides command signals to drive electronics to adjust the amount and/or direction of current flowing into the coils based on feedback signals provided by the haptic actuator and the drive electronics used to generate the drive current.

Another type of haptic engine is a reluctance haptic engine. The reluctance haptic engine typically includes a core, an attractor and one or more flexible support members. The core and/or the attractor may be coupled to an input structure of an electronic device, such as a button cap, trackpad cover, touchscreen cover, or the like. In an unactuated configuration, the flexible support members maintain a gap between the core and the attractor. An electrical current may be applied to one or more conduction loops of the core to actuate the reluctance haptic actuator and provide a haptic output by moving the input structure. The electrical current may cause a magnetic flux that results in a reluctance force that pulls the attractor and the core together and causes the input structure to move (e.g., translate, rotate, oscillate, vibrate, or deform) to produce a haptic output.

Research has shown that certain reluctance haptic engine arrangements introduce severe non-linearities through engine force and stiffness inherent to their design. For these haptic engines, conventional linear feedback controllers by themselves are not sufficient to control the actuator in many haptic feedback applications.

SUMMARY

Embodiments are disclosed for non-linear control of a reluctance haptic engine. In an embodiment, an electronic device comprises: an input structure; a reluctance haptic engine mechanically coupled to the input structure; a linear state controller configured to generate a control signal for controlling a moving mass in the reluctance haptic engine, the control signal generated based on a difference between an estimated position and velocity of the moving mass and a reference position and velocity; drive electronics configured to drive current into at least one coil in the reluctance haptic engine based on the control signal to control the moving mass; and a non-linear state observer configured to generate the estimated position and velocity of the moving mass based on a voltage applied input to the reluctance haptic engine, the current in the at least one coil, and a sensor voltage output from a magnetic field sensor in the reluctance haptic engine that indicates a change in at least one magnetic field induced in the reluctance haptic engine due to the current in the at least one coil.

In an embodiment, the reluctance haptic engine uses a pseudo-linearized reluctance force to generate haptic feedback through the input structure.

In an embodiment, the reluctance haptic engine includes: a top assembly comprising a cover; a middle assembly comprising a support frame, the moving mass disposed within the support frame, flexible structures disposed at opposite ends of the support frame and configured to hold the moving mass in a static position about a magnetic center in an unactuated operation mode, and to deform in response to a force exerted by the moving mass in an actuated operation mode, where the moving mass has a rectangular opening and magnets fixed to opposing inner surfaces of the rectangular opening, each of the magnets having an opposite polarity to its respective adjacent magnets and to its respective corresponding opposing magnets on the opposing side of the rectangular opening; and a bottom assembly comprising, a stator and two coils wound around the stator and separated by an insulating structure, the stator configured to fit withing the rectangular opening of the moving mass, wherein the top assembly, middle assembly and bottom assembly are sandwiched together with the middle assembly disposed between the top cover and the bottom assembly, forming the reluctance haptic engine.

In an embodiment, the non-linear observer models stiffness non-linearities and engine non-linearities with asymmetry.

In an embodiment, the input structure is a touch surface.

In an embodiment, a method comprises: receiving, by a linear state feedback controller, an estimated position and velocity of a moving mass in a reluctance haptic engine and a reference position and velocity; generating, by the linear state feedback controller, a control signal based on the reference position and velocity and the estimated position and velocity; sending, by the linear state feedback control, the control signal to drive electronics coupled to the reluctance haptic engine; responsive to the control signal, adjusting, by the drive electronics, a current into at least one coil in the reluctance haptic engine to generate at least one magnetic field to control the moving mass; receiving, by a non-linear state observer, measurements of the voltage input into the reluctance haptic engine and the current into the at least one coil, and an output voltage from a magnetic field sensor in the reluctance haptic engine, the output voltage indicative of a relative position of the moving mass from a magnetic center position in the reluctance haptic engine; generating, by the non-linear state observer, the estimated position and velocity of the moving mass based at least in part on the voltage input into the reluctance haptic engine, the current into the at least one coil and the voltage output of the magnetic field sensor; and sending, by the non-linear state observer, the estimated position and velocity to the linear state feedback controller.

Other embodiments can include an apparatus, computing device and non-transitory, computer-readable storage medium.

Particular embodiments disclosed herein provide one or more of the following advantages. The disclosed non-linear controller, control system and control method improves high-fidelity position tracking performance for reluctance haptic engine designs that have severe nonlinearities.

The details of one or more implementations of the subject matter are set forth in the accompanying drawings and the description below. Other features, aspects and advantages of the subject matter will become apparent from the description, the drawings and the claims.

DETAILED DESCRIPTION

Overview

Figure 1A:
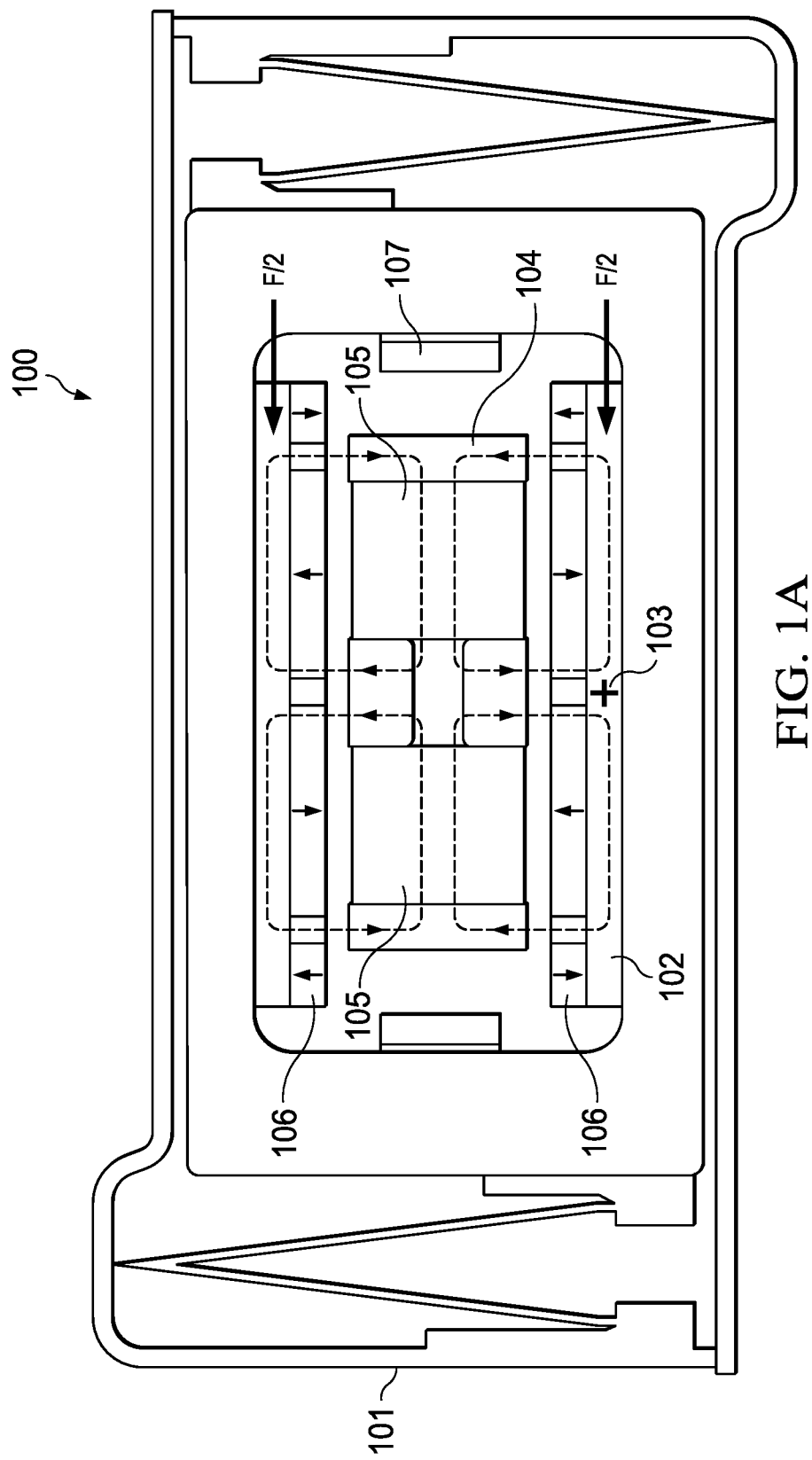
FIG. 1A is top plan view of a reluctance haptic engine with a "sandwich" architecture that uses a pseudo-linearized reluctance force to generate haptic feedback, according to an embodiment.

FIG. 1A is top plan view of reluctance haptic engine 100 with a "sandwich" architecture that uses a pseudo-linearized reluctance force to generate haptic feedback, according to an embodiment. Haptic engine 100 includes support frame 101, moving mass 102, magnetic field sensor 103, stator 104, coils 105, segmented magnets 106 and soft stops 107.

Figure 1B:
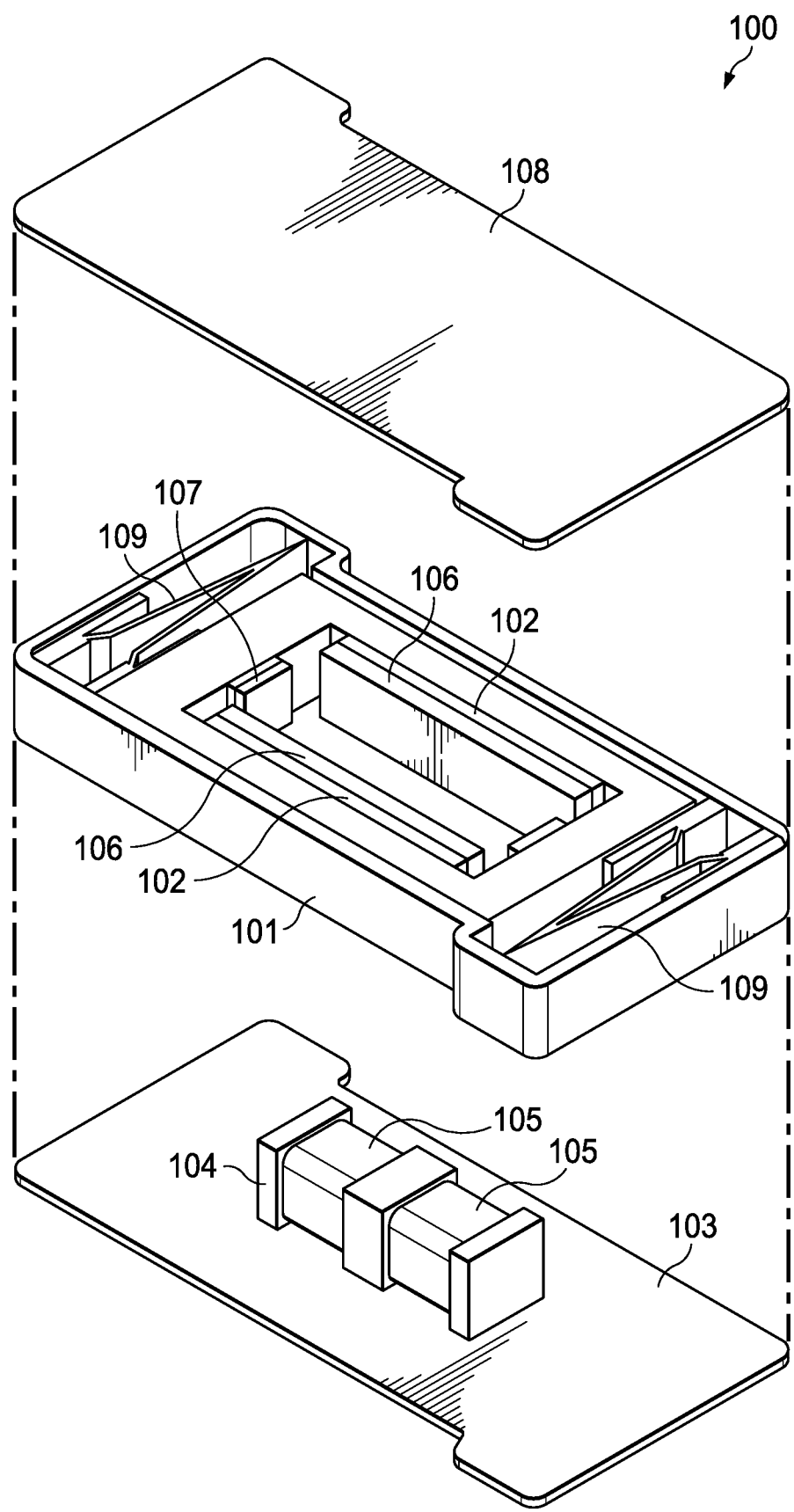
FIG. 1B is an exploded view of the reluctance haptic engine shown in FIG. 1A, according to an embodiment.

FIG. 1B is an exploded view of the reluctance haptic engine shown in FIG. 1A, according to an embodiment. As can be observed, the architecture resembles a "sandwich" comprising three separate structures that are mated together to form a compact reluctance haptic engine suitable for use with electronic devices having small form factors. The three structures include housing cover 108, a middle assembly (including support frame 101, moving mass 102, segmented magnets 106, soft stops 107 and flexible support members 109) and a bottom assembly (including stator 104, coils 105 and magnetic field sensor 103).

Reluctance haptic engine 100 uses a pseudo-linearized reluctance force to generate haptic feedback. The housing cover 108 may couple to an input structure of an electronic device, such as a trackpad cover, touchscreen cover, or the like. In an unactuated configuration, flexible support members 109 maintain a gap between soft stops 107 and stator 104. An electrical current is applied to twin coils 105 wound on stator 104 by drive electronics (not shown) to actuate reluctance haptic engine 100 and provide a haptic output by moving the input structure of the electronic device. More particularly, the electrical current causes a magnetic flux that interacts with segmented magnets 106. Each segmented magnet includes four segments having alternating polarity, and these polarities are opposite the polarities of the opposing segmented magnet on the opposite side of moving mass 102. The interaction of the magnetic flux and the magnetic fields provided segmented magnets 106 generates a pseudo-linearized reluctance force on mover 102.

Figure 2:
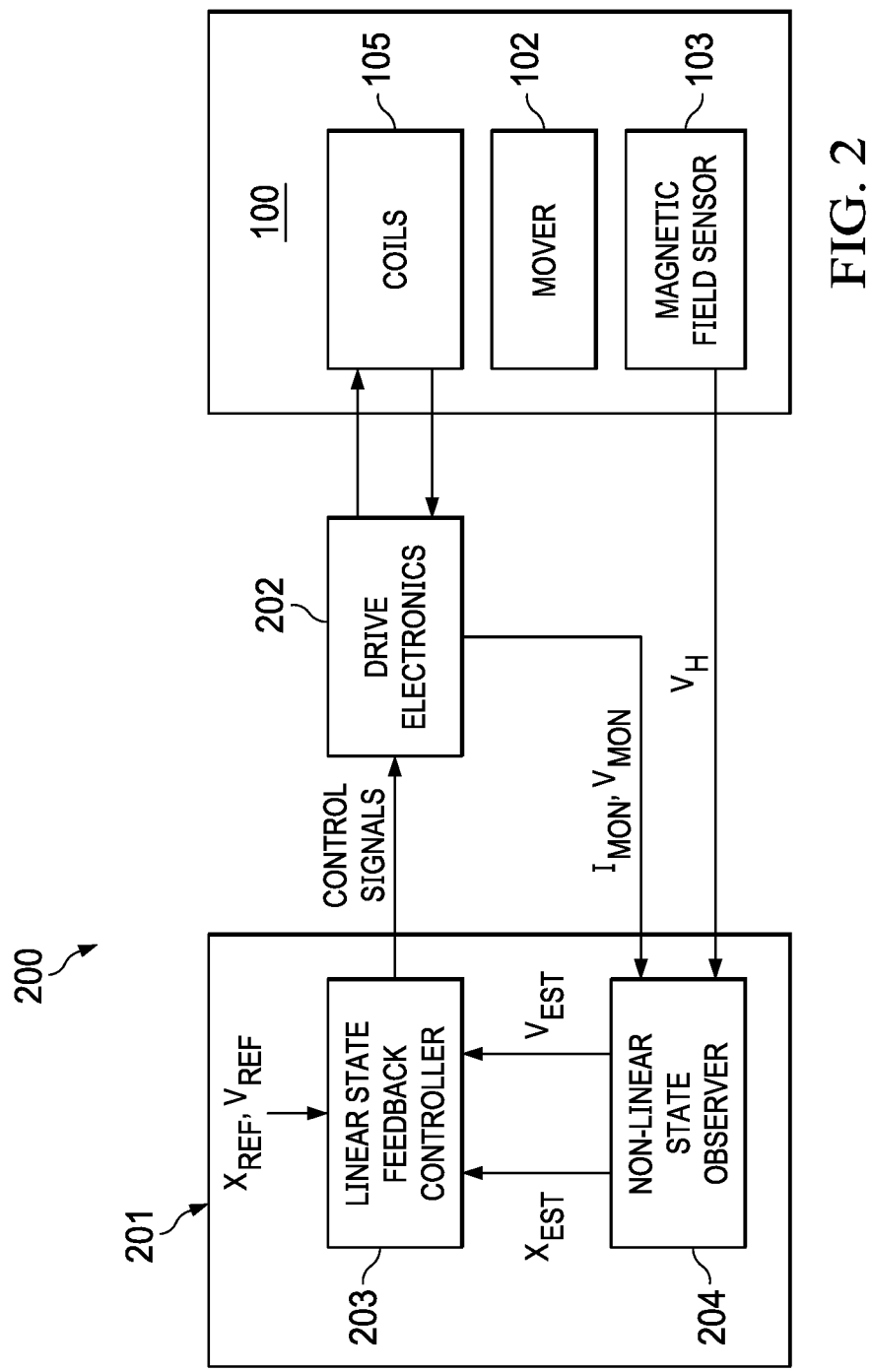
FIG. 2 is a conceptual block diagram of a control system for controlling the reluctance haptic engine shown in FIGS. 1A and 1B using a non-linear observer, according to an embodiment.

By adjusting the current flow into coils 105, moving mass 102 can be made to move and deform flexible member 109 to produce a haptic output. The change in the magnetic field due to the displacement of moving mass 102 relative to stator 104 is measured by magnetic field sensor 103, which in an embodiment can be a Hall-effect sensor. In an unactuated configuration, moving mass 102 is centered about a magnetic center position (e.g., the center portion of stator 104 separating twin coils 105). Magnetic field sensor 103 senses a change in magnetic field and outputs a voltage that proportional to amount of displacement of moving mass 102 relative to the magnetic center position. The sensor voltage is provided to a non-linear state observer, as shown in FIG. 2. The sensor output voltage (e.g., Hall voltage) and monitored current and voltage (e.g., monitored by a power amplifier) are used by the non-linear state observer to estimate changes in position and velocity of moving mass 102 relative to the reference position. The estimated changes in the position and velocity of moving mass 102 are provided by the observer to a linear state feedback controller which compares the estimated position and velocity with a reference position and velocity (typically provided by a processor of the electronic device) and generates a control signal (e.g., using pulse width modulation) that is received by drive electronics and used by the drive electronics to adjust the current in the coils in a closed-feedback loop to reduce the difference between the estimated position and velocity and the reference position and velocity.

FIG. 2 is a conceptual block diagram of a control system 200 for controlling the reluctance haptic engine 100 shown in FIGS. 1A and 1B using a non-linear state observer, according to an embodiment. Control system 200 includes system processor 201, drive electronics 202 and reluctance haptic engine 100. System processor 201 includes linear state feedback controller 203 and non-linear state observer 204. Linear state feedback controller 203 receives reference position and velocity $[X_{REF}, V_{REF}]$ and estimated position and velocity $[X_{EST}, V_{EST}]$ from non-linear state observer 204. Non-linear state observer 204 receives monitored drive voltage and current $[I_{mon}, V_{mon}]$ from drive electronics 202, which is a measurement of the current voltage applied to coils 105 and the current driven into coils 105, respectively. Non-linear state observer 204 also receives a voltage feedback signal, $V_H$, from magnetic field sensor 103 (e.g., a Hall sensor), which indicates a change in a magnetic field generated by segmented magnets 106 due to displacement of mover 102 with respect to the reference position, previously described.

In an embodiment, feedback linearization is provided by non-linear state observer 204. The non-linear model for the reluctance haptic engine 100 is given by Equations [1] and [2]:

$$\ddot{x} = \frac{\omega_0}{Q_t}\dot{x} + \omega_0^2 x + \frac{k_1}{m}x^3 + \frac{k_2}{m}x^5 = \frac{K_{m0}}{mR}K_{mi}(x, i)V, \qquad [1]$$

$$\text{where } K_{mi}(x, i) = 1 - K_{mQ}(x - x_0)^2 - \lambda_0(x - x_0) - \lambda_1 i^2. \qquad [2]$$

In Equation [1], the terms $$\frac{k_1}{m}x^3 + \frac{k_2}{m}x^5$$

model stiffness non-linearity and Equation [2] models engine (motor constant) non-linearity with asymmetry. The definitions for the variables and parameters in Equations [1] and [2] are as follows:

$x, \dot{x}, \ddot{x}$: moving mass displacement, velocity and acceleration, respectively $x_0$: magnetic center position $\omega_0=2\pi f_0$: angular resonant frequency of moving mass in actuated operation mode
$Q_m$: mechanical quality factor of haptic engine
m: moving mass
$i(I_{mon})$: current through coils
V ($V_{mon}$): voltage applied at coils
R: resistance of coils
$K_{m0}$: motor constant at magnetic center (x=$x_0$)
$K_{mQ}$: coefficient of motor constant non-linearity
$k_1$, $k_2$: coefficient of stiffness non-linearity
$\lambda_0$, $\lambda_1$: coefficient of current-dependent motor constant non-linearity The non-linear model described by Equations [1] and [2] is used to derive a non-linear control law comprising input linearization (Equation [3]), state-feedback control with stiffness linearization (Equation [4]) and state observer 204 (Equations [5]) as follows:

Input Linearization:

$$V = LoopGain * x \frac{1}{K_{mi}(x,i)} u, \quad LoopGain \approx \frac{mR\omega_0^2}{K_{m0}}, \quad [3]$$

where x in Equation [3] is the displacement of moving mass 102 from the magnetic center position, $x_0$, which is mapped to the voltage output, $V_H$, of magnetic field sensor 103 shown in FIG. 2.

State feedback control with stiffness-linearization:

$$u = -K_V \dot{\hat{x}} + K_p(x_0 - \hat{x}) + \frac{k_1}{m\omega_0^2}x^3 + \frac{k_2}{m\omega_0^2}x^5, \quad [4]$$

where $K_P$ and $K_V$ are position and velocity gains, respectively, for state feedback control.

Non-Linear State Observer:

$$\dot{\hat{X}} = \quad [5]$$
$$A_{OBS}\hat{X} + B_{OBS}\left(\frac{K_{mi}(x,i)}{LoopGain}V_{mon} - \frac{k_1}{m\omega_0^2}x^3 - \frac{k_2}{m\omega_0^2}x^5\right) + LC_{OBS}(X - \hat{X}),$$

where, $\hat{X}=[\hat{x}, \dot{\hat{x}}]$ is the position/velocity state estimate, which is $[X_{EST}, V_{EST}]$ shown in FIG. 2, $V_{mon}$ is voltage input to the haptic engine monitored by drive electronics 202 and is the same as V in Equations [1] and [3], and $$A_{OBS} = \begin{bmatrix} 0 & 1 \\ -\omega_0^2 & \frac{\omega_0}{Q_t} \end{bmatrix}, \quad B_{OBS} = \begin{bmatrix} 0 \\ 1 \end{bmatrix}, \quad C_{OBS} = [1 \ 0],$$

are the non-linear state-observer matrices, and $$L = \begin{bmatrix} l_1 \\ l_2 \end{bmatrix}$$

is the non-linear state observer gain.

The non-linear engine model is given by Equation [6]:

$$F_{EM}(x,i)=(k_0-k_1x^2-k_2x^4)x+K_{m0}(1-K_{mQ}(x-x_0)^2-\lambda_0(x-x_0)i-\lambda_1(i^2)i, \quad [6]$$

where the terms in Equation [6] are defined above.

In an embodiment, sensitivity to parameter uncertainty can be addressed by linear controller gain-tuning.

Example Process

Figure 3:
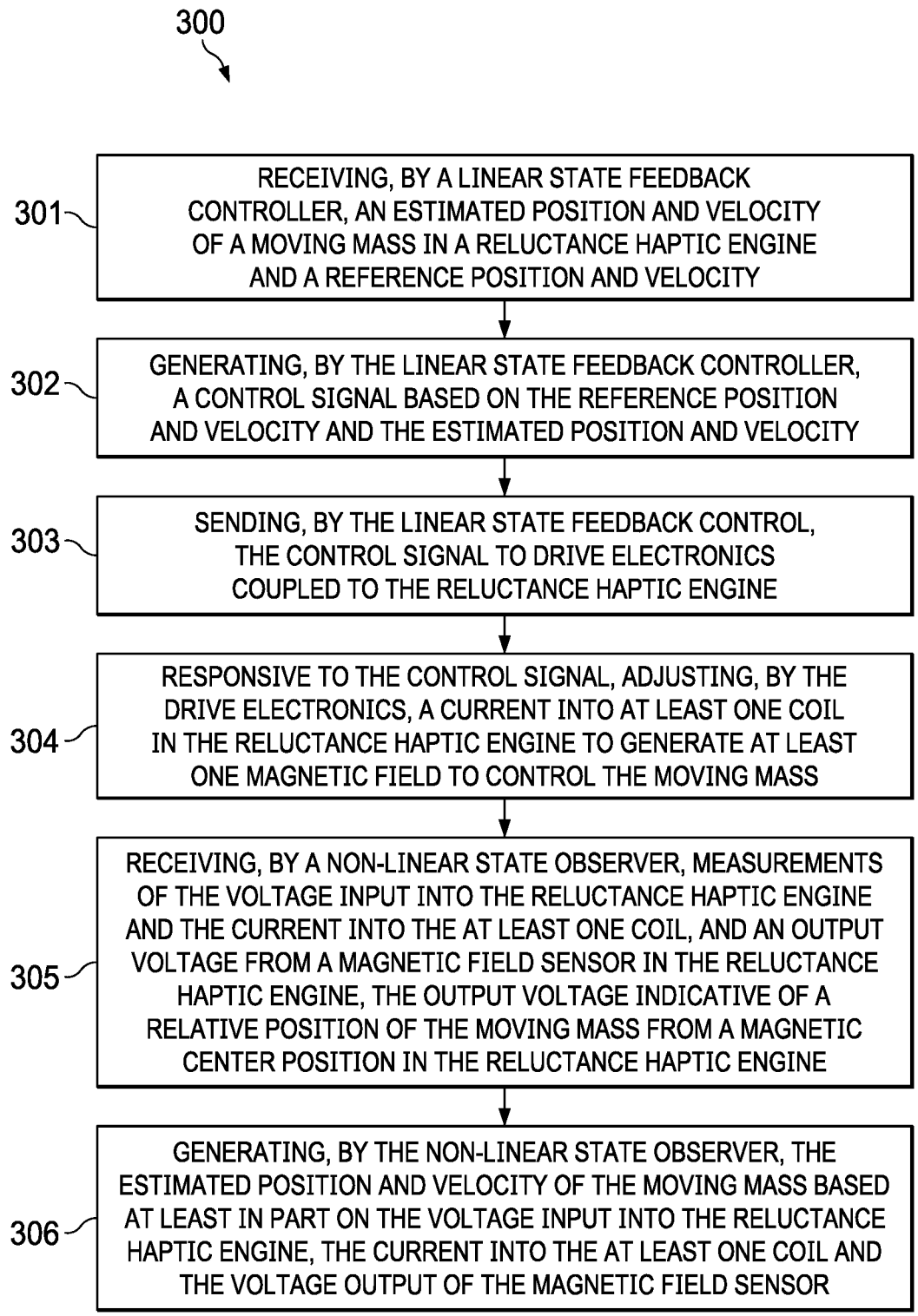
FIG. 3 is a flow diagram of a process of controlling a reluctance haptic engine using a non-linear observer, according to an embodiment.

FIG. 3 is a flow diagram of a process 300 of controlling a reluctance haptic engine using the non-linear state observer 204, according to an embodiment. Process 300 can be implemented using the control system shown in FIG. 2.

Process 300 includes the steps of receiving, by a linear state feedback controller, an estimated position and velocity of a moving mass in a reluctance haptic engine and a reference position and velocity (301), generating, by the linear state feedback controller, a control signal based on the reference position and velocity and the estimated position and velocity (302), sending, by the linear state feedback control, the control signal to drive electronics coupled to the reluctance haptic engine (303), responsive to the control signal, adjusting, by the drive electronics, a current into at least one coil in the reluctance haptic engine to generate at least one magnetic field to control the moving mass (304), receiving, by a non-linear state observer, measurements of the voltage input into the reluctance haptic engine and the current into the at least one coil, and an output voltage from a magnetic field sensor in the reluctance haptic engine, the output voltage indicative of a relative position of the moving mass from a magnetic center position in the reluctance haptic engine (305), and generating, by the non-linear state observer, the estimated position and velocity of the moving mass based at least in part on the voltage input into the reluctance haptic engine, the current into the at least one coil and the voltage output of the magnetic field sensor; and Each of the foregoing steps was previously described in reference to FIGS. 1 and 2.

Example Software/Hardware Architectures

Figure 4:
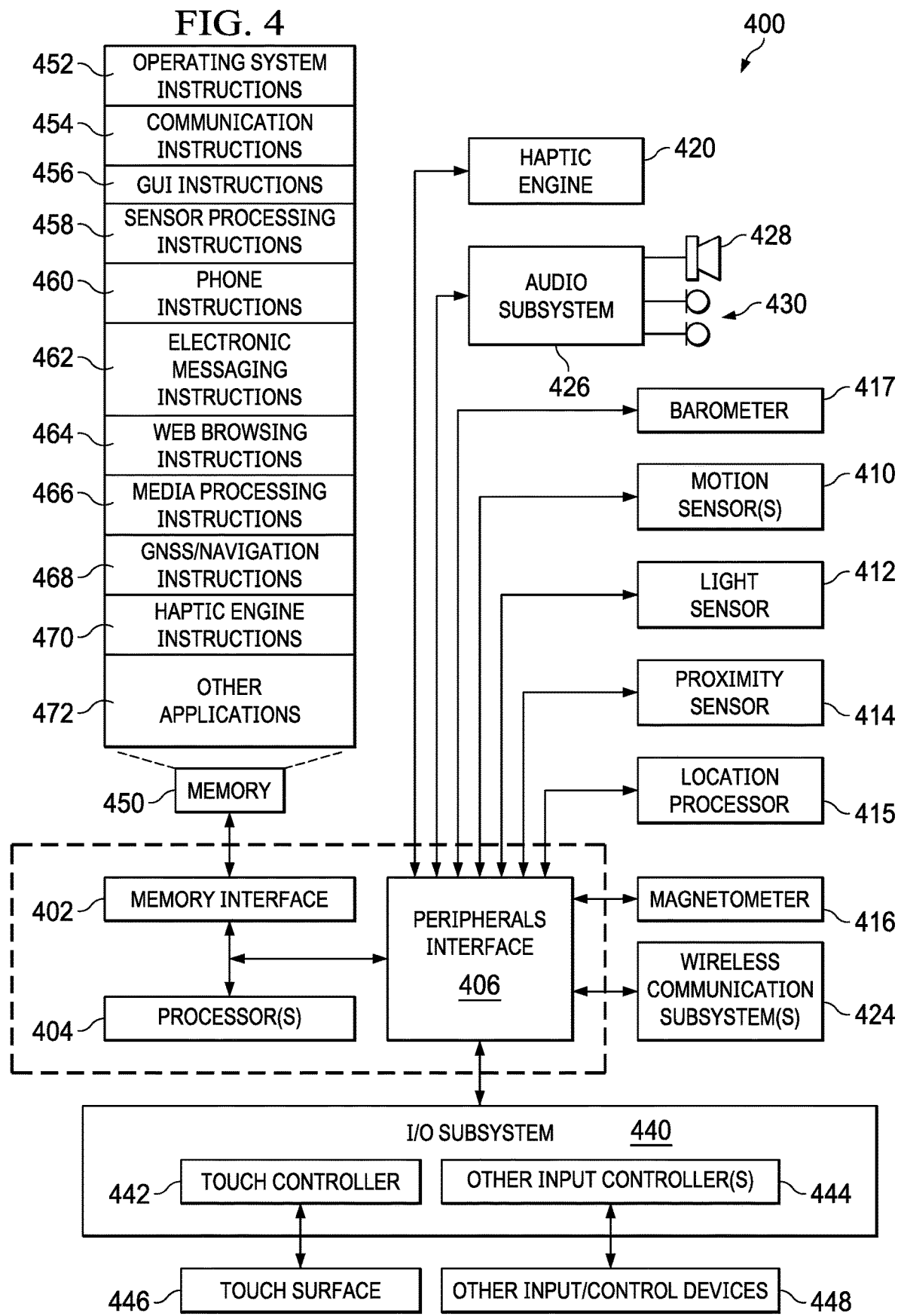
FIG. 4 is a conceptual block diagram of an electronic device architecture that includes the reluctance haptic engine, as described in reference to FIGS. 1-3.

FIG. 4 is a conceptual block diagram of electronic device software/hardware architecture 400 that includes a reluctance haptic engine as described in reference to FIGS. 1-3. Architecture 400 can include memory interface 402, one or more data processors, digital signal processors (DSPs), image processors and/or central processing units (CPUs) 404 and peripherals interface 406. Memory interface 402, one or more processors 404 and/or peripherals interface 406 can be separate components or can be integrated in one or more integrated circuits. In an embodiment, at least one of processors 404 (e.g., a DSP) implements the control system 200, described in reference to FIG. 2.

Sensors, devices and subsystems can be coupled to peripherals interface 406 to provide multiple functionalities. For example, one or more motion sensors 410, light sensor 412 and proximity sensor 414 can be coupled to peripherals interface 406 to facilitate motion sensing (e.g., acceleration, rotation rates), lighting and proximity functions of the wearable computer. Location processor 415 can be connected to peripherals interface 406 to provide geo-positioning. In some implementations, location processor 415 can be a GNSS receiver, such as the Global Positioning System (GPS) receiver. Electronic magnetometer 416 (e.g., an integrated circuit chip) can also be connected to peripherals interface 406 to provide data that can be used to determine the direction of magnetic North. Electronic magnetometer 416 can provide data to an electronic compass application. Motion sensor(s) 410 can be an IMU that includes one or more accelerometers and/or gyros (e.g., 3-axis MEMS accelerometer and 3-axis MEMS gyro) configured to determine change of speed and direction of movement of the source device. Barometer 417 can be configured to measure atmospheric pressure around the mobile device.

Haptic engine 420 is the reluctance haptic engine 100 described in reference to FIGS. 1-3 and generates haptic output through mechanical coupling with an input structure, such as touch surface 446.

Communication functions can be facilitated through wireless communication subsystems 424, which can include radio frequency (RF) receivers and transmitters (or transceivers) and/or optical (e.g., infrared) receivers and transmitters. The specific design and implementation of the wireless communication subsystem 424 can depend on the communication network(s) over which a mobile device is intended to operate. For example, architecture 400 can include communication subsystems 424 designed to operate over a GSM network, a GPRS network, an EDGE network, a Wi-Fi™ network and a Bluetooth™ network. In particular, the wireless communication subsystems 424 can include hosting protocols, such that the mobile device can be configured as a base station for other wireless devices.

Audio subsystem 426 can be coupled to a speaker 428 and one or more microphones 430 to facilitate voice-enabled functions, such as voice recognition, voice replication, digital recording and telephony functions. Audio subsystem 426 can be configured to receive voice commands from the user.

I/O subsystem 440 can include touch surface controller 442 and/or other input controller(s) 444. Touch surface controller 442 can be coupled to a touch surface 446. Touch surface 446 and touch surface controller 442 can, for example, detect contact and movement or break thereof using any of a plurality of touch sensitivity technologies, including but not limited to capacitive, resistive, infrared and surface acoustic wave technologies, as well as other proximity sensor arrays or other elements for determining one or more points of contact with touch surface 446. Touch surface 446 can include, for example, a touch screen or the digital crown of a smart watch. In an embodiment, touch surface 446 can be a pressure-sensitive surface.

Other input controller(s) 444 can be coupled to other input/control devices 448, such as one or more buttons, rocker switches, thumb-wheel, infrared port and USB port. The one or more buttons (not shown) can include an up/down button for volume control of speaker 428 and/or microphones 404. Touch surface 446 or other input control devices 448 (e.g., a button) can include, or be coupled to, fingerprint identification circuitry for use with a fingerprint authentication application to authenticate a user based on their fingerprint(s).

In one implementation, a pressing of the button for a first duration may disengage a lock of the touch surface 446; and a pressing of the button for a second duration that is longer than the first duration may turn power to the mobile device on or off. The user may be able to customize a functionality of one or more of the buttons. The touch surface 446 can, for example, also be used to implement virtual or soft buttons.

In some implementations, the mobile device can present recorded audio and/or video files, such as MP3, AAC and MPEG files. In some implementations, the mobile device can include the functionality of an MP3 player. Other input/output and control devices can also be used.

Memory interface 402 can be coupled to memory 450. Memory 450 can include high-speed random access memory and/or non-volatile memory, such as one or more magnetic disk storage devices, one or more optical storage devices and/or flash memory (e.g., NAND, NOR). Memory 450 can store operating system 452 instructions, such as the iOS operating system developed by Apple Inc. of Cupertino, Calif. Operating system 452 may include instructions for handling basic system services and for performing hardware dependent tasks. In some implementations, operating system 452 can include a kernel (e.g., UNIX kernel).

Memory 450 may also store communication instructions 454 to facilitate communicating with one or more additional devices, one or more computers and/or one or more servers, such as, for example, instructions for implementing a software stack for wired or wireless communications with other devices. Memory 450 may include graphical user interface instructions 456 to facilitate graphic user interface processing; sensor processing instructions 458 to facilitate sensor-related processing and functions; phone instructions 460 to facilitate phone-related processes and functions; electronic messaging instructions 462 to facilitate electronic-messaging related processes and functions; web browsing instructions 464 to facilitate web browsing-related processes and functions; media processing instructions 466 to facilitate media processing-related processes and functions; GNSS/Location instructions 468 to facilitate generic GNSS and location-related processes; and haptic engine instructions 470 for generating haptic output on touch surface 446. Memory 450 further includes other application instructions 472 for use various applications, including applications that utilize haptic output.

Each of the above identified instructions and applications can correspond to a set of instructions for performing one or more functions described above. These instructions need not be implemented as separate software programs, procedures, or modules. Memory 450 can include additional instructions or fewer instructions. Furthermore, various functions of the mobile device may be implemented in hardware and/or in software, including in one or more signal processing and/or application specific integrated circuits.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., SWIFT, Objective-C, C#, Java), including compiled or interpreted languages, and it can be deployed in any form, including as a stand-alone program or as a module, component, subroutine, a browser-based web application, or other unit suitable for use in a computing environment.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

What is claimed is:

1. An electronic device comprising:
   an input structure;
   a reluctance haptic engine mechanically coupled to the input structure;
   a linear state controller configured to generate a control signal for controlling a moving mass in the reluctance haptic engine, the control signal generated based on a difference between an estimated position and velocity of the moving mass and a reference position and velocity;
   drive electronics configured to drive current into at least one coil in the reluctance haptic engine based on the control signal to control the moving mass; and
   a non-linear state observer configured to generate the estimated position and velocity of the moving mass based on a voltage applied input to the reluctance haptic engine, the current in the at least one coil, and a sensor voltage output from a magnetic field sensor in the reluctance haptic engine that indicates a change in at least one magnetic field induced in the reluctance haptic engine due to the current in the at least one coil.

2. The electronic device of claim 1, wherein the reluctance haptic engine uses a pseudo-linearized reluctance force to generate haptic feedback through the input structure.

3. The electronic device of claim 1, wherein the reluctance haptic engine includes:
   a top assembly comprising a cover;
   a middle assembly comprising a support frame, the moving mass disposed within the support frame, flexible structures disposed at opposite ends of the support frame and configured to hold the moving mass in a static position about a magnetic center in an unactuated operation mode, and to deform in response to a force exerted by the moving mass in an actuated operation mode, where the moving mass has a rectangular opening and magnets fixed to opposing inner surfaces of the rectangular opening, each of the magnets having an opposite polarity to its respective adjacent magnets and to its respective corresponding opposing magnets on an opposing side of the rectangular opening; and
   a bottom assembly comprising, a stator and two coils wound around the stator and separated by an insulating structure, the stator configured to fit within the rectangular opening of the moving mass,
   wherein the top assembly, middle assembly and bottom assembly are sandwiched together with the middle assembly disposed between the cover of the top assembly and the bottom assembly, forming the reluctance haptic engine.

4. The electronic device of claim 1, wherein the non-linear state observer models stiffness non-linearities and engine non-linearities with asymmetry.

5. The electronic device of claim 1, wherein the input structure is a touch surface.

6. A method comprising;
   receiving, by a linear state feedback controller, an estimated position and velocity of a moving mass in a reluctance haptic engine and a reference position and velocity;
   generating, by the linear state feedback controller, a control signal based on the reference position and velocity and the estimated position and velocity;
   sending, by the linear state feedback control, the control signal to drive electronics coupled to the reluctance haptic engine;
   responsive to the control signal, adjusting, by the drive electronics, a current into at least one coil in the reluctance haptic engine to generate at least one magnetic field to control the moving mass;
   receiving, by a non-linear state observer, measurements of a voltage input into the reluctance haptic engine and the current into the at least one coil, and an output voltage from a magnetic field sensor in the reluctance haptic engine, the output voltage indicative of a relative position of the moving mass from a magnetic center position in the reluctance haptic engine;
   generating, by the non-linear state observer, the estimated position and velocity of the moving mass based at least in part on the voltage input into the reluctance haptic engine, the current into the at least one coil and the output voltage of the magnetic field sensor; and
   sending, by the non-linear state observer, the estimated position and velocity to the linear state feedback controller.

7. The method of claim 6, wherein the reluctance haptic engine uses a pseudo-linearized reluctance force to generate haptic feedback through an input structure.

8. The method of claim 6, wherein the non-linear state observer models stiffness non-linearities and engine non-linearities with asymmetry.

\* \* \* \* \*